Jan. 21, 1964  E. P. BUCEK  3,118,620
FLUORESCENT LIGHTING FIXTURE
Filed Aug. 31, 1960  3 Sheets-Sheet 2
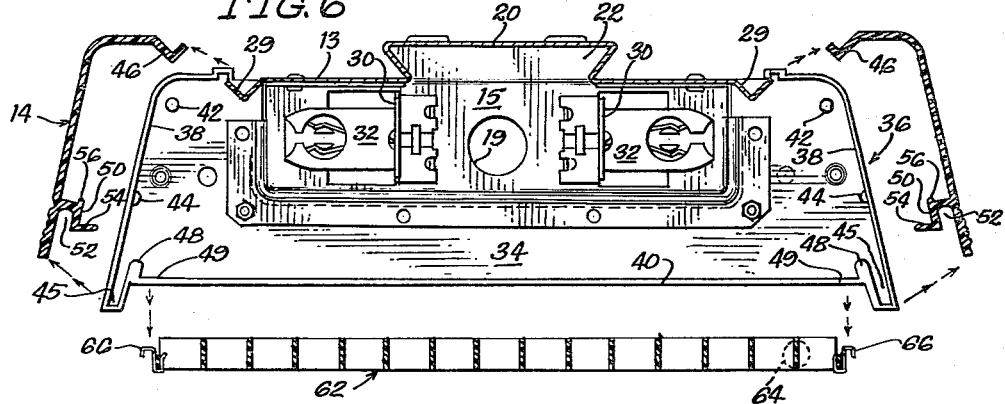
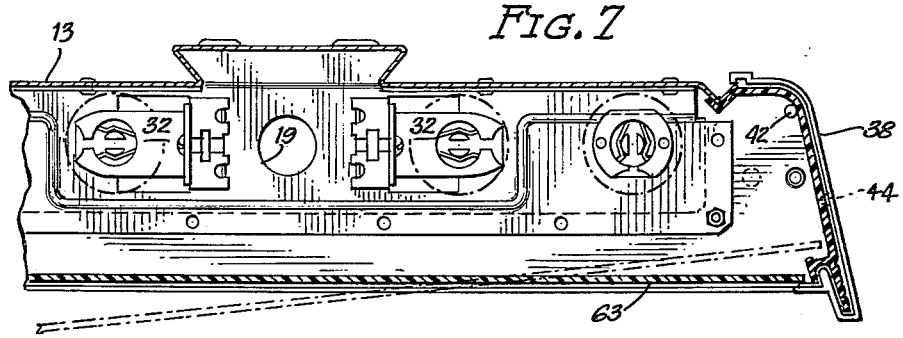
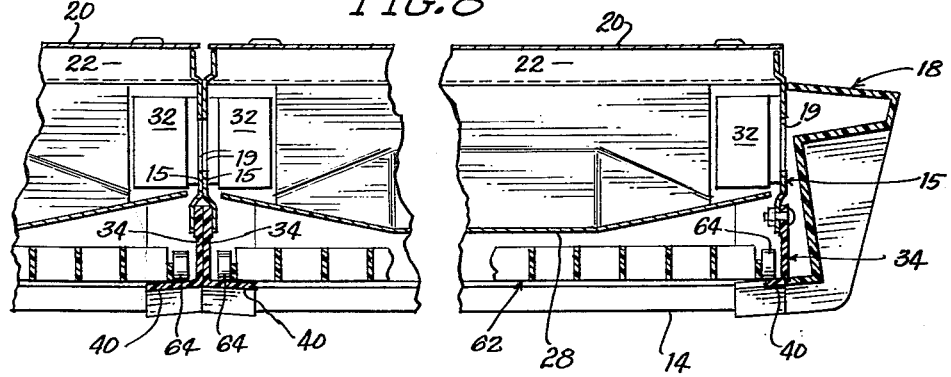
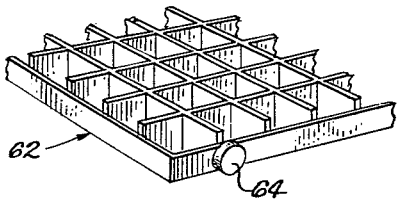
INVENTOR.
Edward P. Bucek
BY Ooms, McDougall,
Williams & Hersh
Attorneys INVENTOR.
Edward P. Bucek
BY Ooms, McDougall,
Williams & Hersh
Attorneys

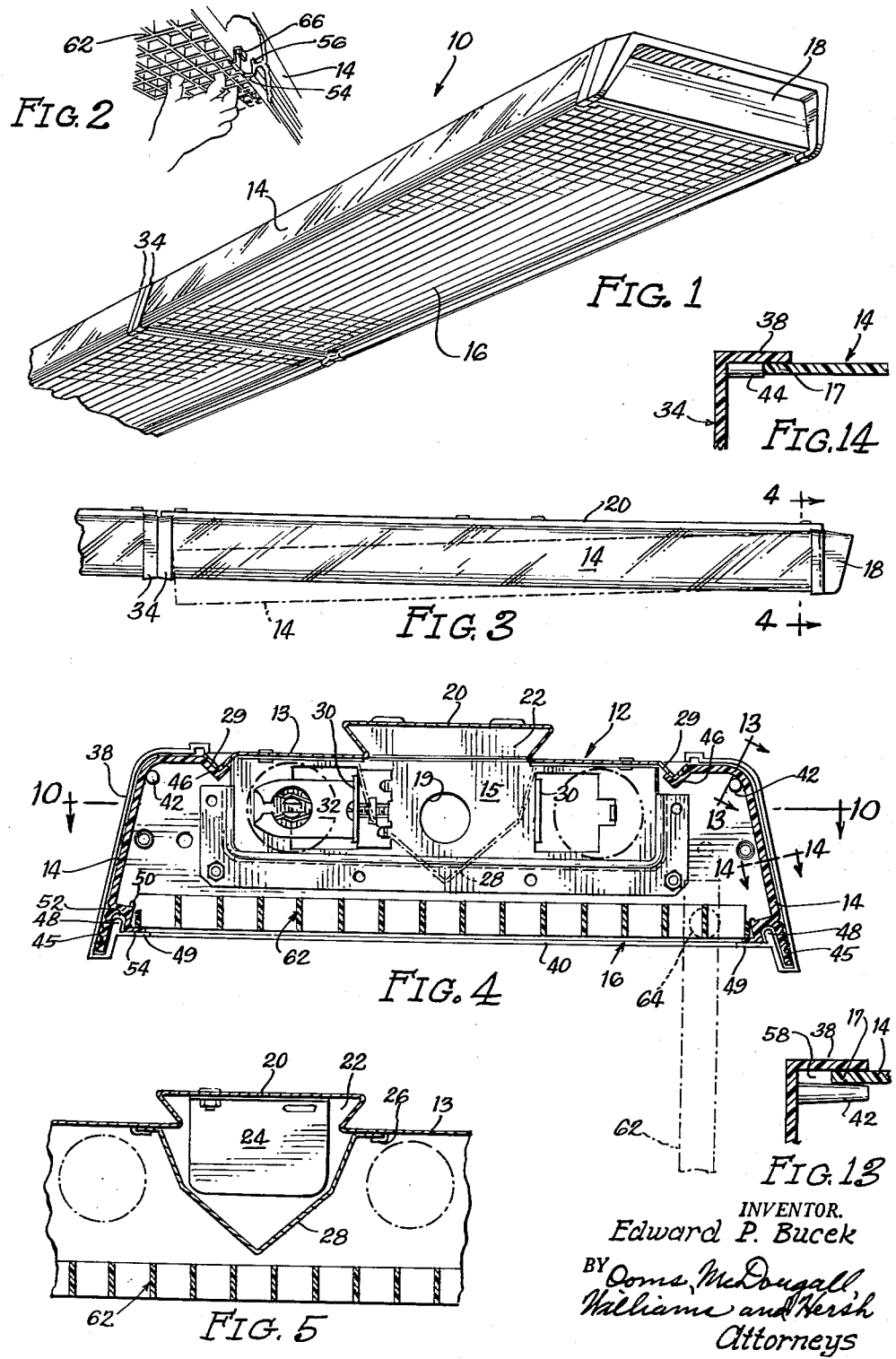

United States Patent Office 3,118,620
Patented Jan. 21, 1964

3,118,620
FLUORESCENT LIGHTING FIXTURE
Edward P. Bucek, Lyons, Ill., assignor, by mesne assignments, to Curtis-Electro Lighting, Inc., Chicago, Ill.
Filed Aug. 31, 1960, Ser. No. 53,201
9 Claims. (Cl. 240—51.11)

This invention relates to a light fixture and is an improvement on the light fixture described in copending application Serial Number 19,105, filed March 31, 1960.

The fluorescent light fixture described in the above identified patent application was attractive, simple in construction and was formed of separate sub-assemblies joined together in a simple expedient manner. However, the basket or luminaire surrounding the fluorescent lights and which determine the appearance of the fixture was channel-shaped in cross section to provide maximum illumination through the bottom and sides of the fixture. This created difficulties because the basket which was formed from rigid plastic was expensive, fragile, and bulky. When they were damaged they were expensive to replace and their bulk made it difficult for store owners to keep large numbers of different designs on hand to satisfy the color and style requirements of the customers.

If the baskets or luminaires were formed from a plurality of separate parts, they would be easier to ship, less bulky to store, and the cost of replacing damaged parts would be less than the present cost of replacing the entire basket. In addition, a small variation in the design and color of the various parts would result in a much larger variation in the design of the assembled basket, thus giving the customer a greater choice.

What is needed therefore and among other things comprises an important object of this invention is a fluorescent light fixture which may be easily and efficiently assembled at the station of use from relatively few parts and which is provided with a basket or luminaire which is also formed from a plurality of parts so that small variations in the color and appearance of the parts forming the luminaire result in a much larger variation in the number of possible designs of the light fixture.

Another object of this invention is to provide a fluorescent light fixture formed in a large measure from easily assembled plastic parts, and which is designed so that the fit of the plastic parts is not affected by prolonged exposure to heat.

This and other objects of this invention will become more apparent when read in the light of the accompanying drawing and specification wherein:

FIG. 1 is a perspective view of the improved light fixture showing how the fixtures appear when coupled together in end to end relationship.

FIG. 2 is a perspective view of a portion of the closure panel showing a hook-shaped support member attached thereto and an associated hook receiving rib on a side panel.

FIG. 3 is a side elevational view of the fixtures shown in FIG. 1.

FIG. 4 is a sectional view taken on the line 4—4 of FIG. 3, but with the fluorescent lamps and one socket omitted to show structural features.

FIG. 5 is a cross sectional view of a portion of the fixture showing the ballast member mounted inside the wireway.

FIG. 6 is an exploded sectional view of the light fixture with the fluorescent lamps omitted.

FIG. 7 is a partial sectional view of a four lamp fixture with a generally flat bottom closure.

FIG. 8 is a longitudinal section of the fixture shown in FIG. 3 and showing the pivotally mounted closure and the decorative end plates.

FIG. 9 is a perspective view of a portion of an egg crate louver closure showing its cylindrical trunnions.

FIG. 13 is a sectional view taken on the line 13—13 of FIG. 4.

FIG. 14 is a sectional view taken on the line 14—14 of FIG. 4.

Figure 10:
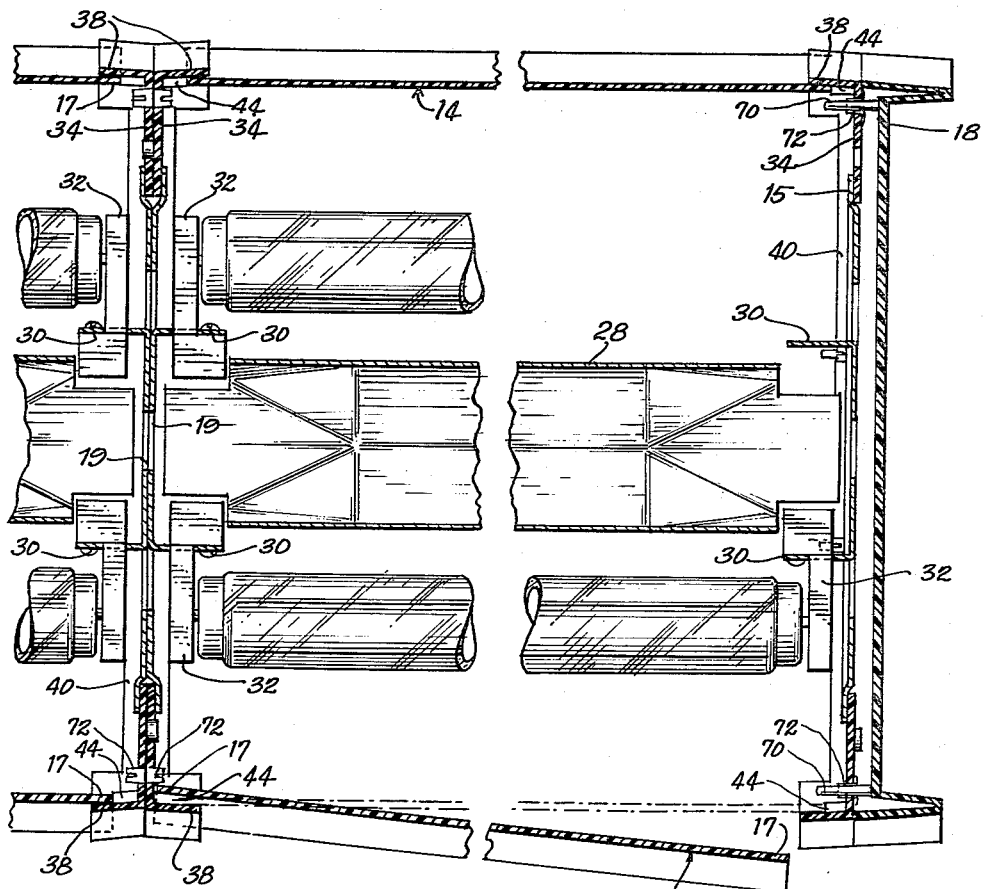
FIG. 10 is a sectional view taken on the line 10—10 of FIG. 4.

Referring now to FIGS. 1, 3 and 4 of the drawings, a fluorescent light fixture indicated generally by the reference numeral 10 includes a chassis 12 formed from sheet metal or some suitable plastic. In addition, the light fixture includes a pair of separate side panels 14, a closure member 16 and decorative ends 18.

The chassis 12 comprises a base 13 and opposed downwardly bent end portions 15. The base 13 is formed with a centrally positioned upwardly raised portion 20 defining a recess or wireway 22 for accommodating the wires and ballast 24, see FIG. 5. It also finds benefit for use of clamp-type hangers for suspension of the fixture from the ceiling as described in Patent No. 2,736,528. Clips or spaced support tabs 26 struck downwardly from base 13, as shown provide a means for releasable holding the resilient sheet metal wireway cover 28 over the wireway 22, in a manner well known in the art.

In addition, the lateral side edges 29 of base 13 are formed to a V-shaped for nesting in corresponding V-shaped portions of the side panels 14, as described below. As best seen in FIGS. 4, 6, and 10, tabs 30 are struck out from end portions 15 and are transverse thereto. These tabs constitute supports for fluorescent lamp sockets 32.

Intermediate end plates 34, preferably formed from a molded plastic, are removably secured to end portions 15 by means of conventional quick connect pins and socket members 35 to form an assembled end piece 36 on each end of the fixture, see FIG. 6. The end plates 34 are provided with inwardly projecting side and bottom flanges 38 and 40, which serve as side panel and closure supports. The side flanges 38 correspond in shape to the cross section of the side panels 14, see FIG. 4, and are adapted to receive the end portions of the side panels as described below. In addition, the end plates 34 are provided with attached outwardly projecting first and second pins 42 and 44, see FIG. 6. These pins position and hold the side panels 14 on the end plates 34. Pins 42 on each side of each end plate are in spaced relation to the inner surface of the adjacent side flanges 38, with pin 44 shorter than pin 42, and flanges 38 abut against the inner surfaces of side panels 14. The bottom of each side flange 38 is U-shaped in cross section defining a panel support guideway 45. The free end of said U-shaped portion terminates in an upwardly projecting side panel positioning and support boss 48 and a support ledge 49. As seen in FIG. 6, the bottom flange 40 is coplanar with and attached to this support ledge 49.

The side panels 14 are preferably formed from a plastic translucent material and they may have a variety of different colors and patterns. In length the side panels are substantially equal to the distance between the ends of pins 44 to permit their removal from the fixture by pressing and deforming them to break the engagement between their ends with the ends of pins 44, as described below. The top of each side panel is provided with a V-shaped edge 46 to interfit with the V-shaped edges 29 on the sides of the end plate 34, see FIG. 4.

As best seen in FIG. 6, the bottom of the side panels is designed to enter and is supported by support guideway 45. In addition the bottom of the side panels is provided with an inwardly offset leg 50 defining a downwardly open boss receiving groove 52. The leg includes a foot or closure support ledge 54 and an upstanding knee or hook receiving rib 56.

In assembled relation, see FIGS. 4 and 13, the ends 17 of the side panels 14 are confined both in guideway 58 defined by the inner surface of flange 38 and pin 42 and in the support guideway 45. In addition, the boss receiving groove 52 of each side panel rests on and is supported by boss 48 and the foot or closure support ledge 54 is supported by support ledge 49. With this arrangement, the side panels are held in a generally horizontal position on each side of the light fixture.

As seen in FIG. 10, the length of the side panels 14 is greater than the separation between the free ends of the flanges 38 but is less than the separation between the end plates 34 on the opposite ends of fixture 10. To assemble the side panel 14 on the fixture, one end 17 of the panel is inserted in a guideway 58 on one end of panel 34 until its edge abuts against the end of pin 44. Then enough force is exerted on the side of the resilient side panel 14 until its end 17 clears pin 44 so that the side panel can be moved further into guideway 58 until end 17 abuts against the end plate 34, see FIG. 10. Then the opposite end 17 of the side panel will have enough room so it can be pivoted into alignment with the guideway 48 of the end plate 34 on the opposite end of the fixture. Next the side panel 14 is shifted until each end abuts against a pin 44 in the end plate on the opposite ends of the fixture, see FIGS. 10 and 14. It is apparent that this arrangement permits the side panels to be easily assembled and removed for cleaning or replacement.

Figure 11:
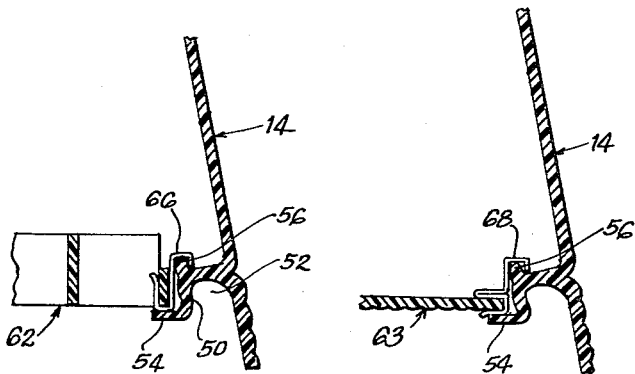
FIG. 11 is a sectional view showing the hook member attached to the egg crate louver locked on the hook receiving rib of the side panel.
Figure 12:
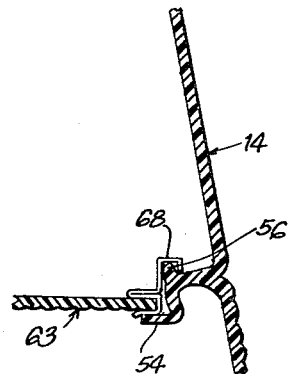
FIG. 12 is a sectional view showing the hook member attached to a flat translucent closure member locked on the hook receiving rib of the side panel.

The bottom of fixture 10 is covered by a removably mounted decorative plastic closure 62. The closure may have various forms and colors to provide styling variations in the fixture such, for example, as a lens, louver, diffuser, or panel of egg crate construction. In the embodiment shown in FIGS. 4 and 11, the closure may be described as an egg crate louver, while the louver, diffuser or lens 63 shown in FIG. 12 is formed from a translucent plastic material.

In the examples shown, the louvers are generally rectangular in appearance, although other shapes are contemplated. Cylindrical trunnions 64 are secured to the opposite ends of the louvers, see FIGS. 8 and 9. In assembled condition, these trunnions rest on and are supported by bottom flange 40 on the end plates 34, while the sides of the louvers rest on and are supported by the support ledge or flange 54 on the side panels 14, see FIG. 4.

With this ararngement, the louver can be pivoted to a vertical position with the trunnions resting on support flange 40 to provide access to the interior of the fixture for maintenance, see the dotted line position in FIG. 4. The spacing between the bottom flanges 40 on the end plates 34 on the opposite ends of the fixture, and the space between the support flangs 54 on the opposed side panels is sufficient to permit the louver to be shifted until it can be tilted and slide completely out of the fixture.

The end plates, side panels, and louvers are preferably made of molded plastic, and since the fluorescent lamps give off heat, over a period of time, this heat would cause the plastic side panels and end plates to warp and destroy the fit of the parts. To prevent this from happening, hooks 66 are secured to the opposite sides of the egg crate louvers 62, as shown in FIGS. 2 and 11, and hooks 68 are secured to the opposite sides of louver 63. In both cases, these hooks fit over knee or hook receiving ribs 56 on the side panels 14, see FIGS. 11 and 12. This arrangement is important both because it helps support the louver on the side panels 14 and because it also prevents prolonged proximity to heat from the lamps, from warping the side panels and end plates so much that they can no longer support the louver.

As best seen in FIGS. 1, 3, 9 and 10, the fixtures are designed so they can be connected together in end to end relationship. To do this, the end portions 15 on the chassis of adjacent fixtures are positioned in abutting engagement with each other. These end portions are provided with screw holes (not shown) which when the fixtures are properly positioned are in alignment with each other for receiving locking screws (not shown) to hold the fixtures together in a manner well known in the art. The end portions 15 are provided with an opening 19 so that wires in the wireway in one fixture can pass through into the wireway of the adjacent fixture, see FIGS. 7 and 10. The intermediate plates 34 register back to back in alignment by means of the pins and holes.

The decorative end members 18 cover the ends of a fixture or the ends of a line of fixtures connected together in end to end relationship. These end members 18 are preferably formed from plastic and may have a variety of suitable shapes and colors. Pins 70 which in this embodiment are integrally molded with the decorative ends 18 project transversely therefrom. These pins are designed to penetrate gripping sleeves 72 mounted in the end plates 34, see FIG. 10, whereby the decorative members 18 can be quickly and easily mounted on the opposite ends of a fixture of the opposite ends of a line of fixtures in a manner well known in the art. Thus, the decorative end plates register into the intermediate plates by the recess around the perimeter to provide hairline junction.

It is evident that the four lamp fixture shown in FIG. 7 differs from the two lamp fixture shown in FIG. 6 only in that it is wider to accommodate an extra pair of fluorescent lamps and sockets.

It will be understood that this fixture may be used with other kinds of lamps and numerous other changes may be made in the details of construction, arrangement, and operation, without departing from the spirit of the invention, especially as defined in the following claims.

I claim:

1. A lighting fixture comprising a base for holding the lights, sockets and current elements, a pair of elongate light transmitting side panels with each side panel having a bottom edge and opposite ends, means for removably mounting the side panels in vertical position on said base comprising a pair of vertically disposed end pieces secured in parallel relation to the opposite ends of the base and spaced one from the other by an amount greater than the length of the side panels, side flanges extending inwardly from the lateral edges of each end piece and a bottom flange extending inwardly from the bottom edge of each end piece with the side flanges being dimensioned to have a length whereby the spaced relation between the inner edges of side flanges on opposite end pieces is less than the length of the side panels but whereby the spaced relationship between the inner edge of the side flange on one end piece and the opposite end piece is greater than the length of the side panels whereby when the side panels are displaced endwise with one end against one end piece, the opposite end of the side panel will clear the side flange of the opposite end piece, and when the side panels are centered between the end pieces, the ends of the side panels will be overlapped by portions of the side flanges on each of the end pieces to retain the panel between the end pieces and at rest on the bottom flange, a pin on each end piece adjacent the side flanges and aligned with the ends of the side panels when in position of use between the end pieces, the pin in one end piece being spaced from the pin in the opposite end piece by an amount corresponding to the length of the side panels whereby the side panels are retained between the pins to retain the side panels in centered relation between the end pieces, and a light transmitting closure removably mounted on the fixture and covering the space between the mounted side panels.

2. The light fixture described in claim 1 wherein the side panels are provided with closure supports and the sides of the light transmitting closure are removably supported on the closure supports on each side panel.

3. The light fixture described in claim 2 wherein the closure supports on said side panels comprise inwardly extending support ledges formed on the lower end of said side panels.

4. The light fixture described in claim 3 including additional closure supports on said end pieces whereby the said light-transmitting closure is removably supported by said side panels and by said end pieces.

5. The light fixture described in claim 4 wherein the closure supports on the end pieces comprise inwardly extending flanges on the lower edges thereof.

6. The light fixture described in claim 5 including trunnions on each end of said closure, said trunnions engaging and supported by the inwardly extending flanges on the lower edges of said end pieces whereby the closure is pivotally mounted on said fixture.

7. A light fixture comprising a base for holding lights, sockets, and circuit elements, said base having opposed downwardly extending ends, a molded plastic end plate removably mounted on each end, each end plate having horizontally and inwardly projecting side flanges and a bottom flange, the bottom portion of each side flange U-shaped in cross section and defining a panel support guideway, the free ends of each U-shaped flange portion terminating in an upwardly projecting side panel positioning and support boss, a pair of separated molded plastic light transmitting side panels, the cross sectional shape of each side panel corresponding generally to the cross sectional shape of the side flanges of the end plates and including a lower edge and an inwardly offset leg defining a downwardly open boss receiving groove, the lower edge at the ends of each side panel penetrating and supported by said U-shaped flange portion, and the boss receiving groove at the ends of each side panel penetrated by and resting on the bosses, in the opposed end plates of the fixture whereby the side panels are held in a horizontal position on each side of the fixture first outwardly extending generally horizontal pin members on the facing side of each end plate, said first pin members adjacent to and in spaced parallel relation to each side flange and defining a panel guideway therebetween, the ends of each panel on each side of the end plate confined in the panel guideway between said first pin members and the adjacent side flanges, second pin members shorter than the first pin members and said side flanges, said second pin members parallel to and abutting against the inner surfaces of the side flanges on each end plate, the ends of said second pin members abutting the end edges of the side panels whereby the side panels are held and positioned on and against the side flanges on each side of the end plates, an inwardly extending generally horizontal closure support ledge formed on the lower edge of the leg of each panel, a light transmitting closure having opposed sides and ends, said opposed sides and ends resting on and supported by said ledge portions in the side panels and on the bottom flange of each end plate.

8. A light fixture comprising a base for holding lights, sockets, and circuit elements, said base having opposed, vertically disposed, downwardly extending ends, a molded plastic end plate removably mounted on each end, each end plate having vertically disposed, inwardly projecting side flanges and a vertically disposed, inwardly projecting bottom flange, the bottom portion of each side flange U-shaped in cross section and defining a panel support guideway, the free ends of each U-shaped flange portion terminating in an upwardly projecting side panel positioning and support boss, a pair of separate vertically disposed, molded plastic light transmitting side panels, the cross sectional shape of each side panel corresponding generally to the cross sectional shape of the side flanges of the end plates and including a lower edge and an inwardly offset leg defining a downwardly open boss receiving groove, the lower edge at the ends of each side panel penetrating and supported by said U-shaped flange portion, and the boss receiving groove at the ends of each side panel penetrated by and resting on the bosses, in the opposed end plates of the fixture whereby the side panels are held in a horizontal position on each side of the fixture, an inwardly extending generally horizontal closure support ledge formed on the lower edge of the leg of each panel, a light transmitting closure having opposed sides and ends, said opposed sides and ends resting on and supported by said ledge portions in the side panels and on the bottom flange of each end plate, a knee-like rib on the upper edge of said leg, and downwardly open hook members secured to the opposite sides of said closure, said hook members hooked over said knee-like rib on the side panels on the opposite side of the fixture both to further support the closure on the side panels and to hold the side panels in alignment to prevent them from warping due to prolonged proximity to heat from the lamps in the fixture.

9. A lighting fixture as claimed in claim 1 which includes another pin extending inwardly from each of the end pieces in parallel relation with each of the side flanges and spaced inwardly therefrom by an amount greater than the thickness of the side panels and dimensioned to have a length less than the difference between the lengths of the side panels and the spaced relationship between the end pieces but greater than one-half the difference thereof so that the edges of the panels will be received between the side flanges and said second pins when the side panels are in their centered relation between the end pieces with the bottom edge of the side panels resting upon the bottom flange.

References Cited in the file of this patent

UNITED STATES PATENTS

| | | |
|---|---|---|
| 2,291,488 | Naysmith | July 28, 1942 |
| 2,364,992 | Maurette | Dec. 12, 1944 |
| 2,463,013 | Beals | Mar. 1, 1949 |
| 2,526,074 | Guth | Oct. 17, 1950 |
| 2,566,845 | Levaur et al. | Sept. 4, 1951 |
| 2,597,739 | Lacy et al. | May 20, 1952 |
| 2,606,998 | Winkler | Aug. 12, 1952 |
| 2,646,498 | Marchisio | July 21, 1953 |
| 2,864,939 | Bodian et al. | Dec. 16, 1958 |
| 2,946,880 | Picho et al. | July 26, 1960 |